Nov. 23, 1965 L. A. DETTLOF 3,218,937
VARIABLE RATIO POWER STEERING GEAR
Filed May 6, 1963 5 Sheets-Sheet 1
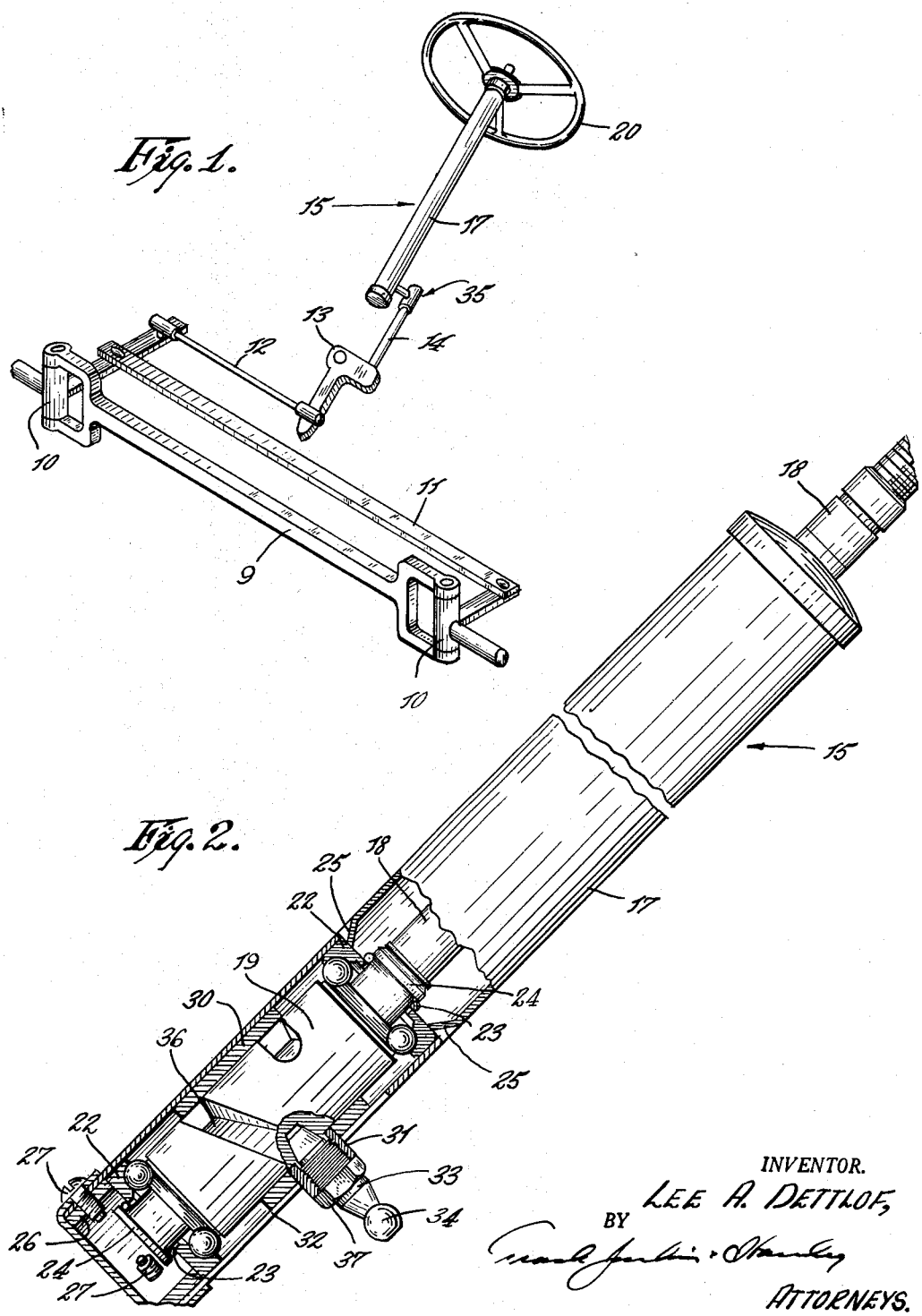
INVENTOR.
LEE A. DETTLOF,
BY
ATTORNEYS.

Nov. 23, 1965     L. A. DETTLOF     3,218,937
VARIABLE RATIO POWER STEERING GEAR
Filed May 6, 1963     5 Sheets-Sheet 2
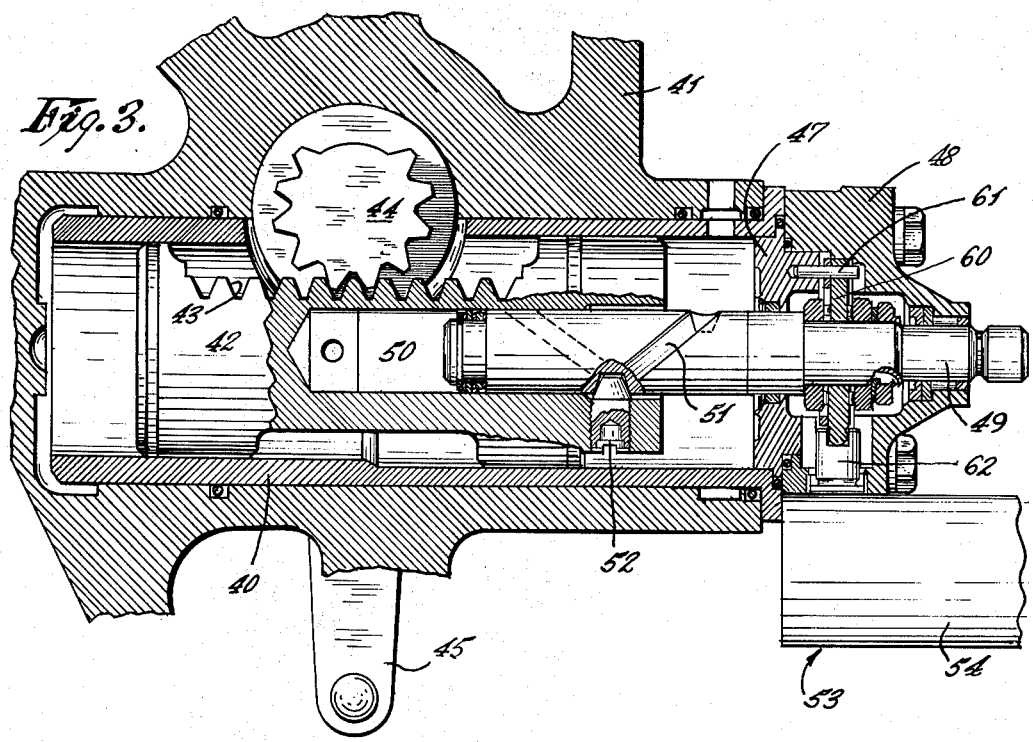
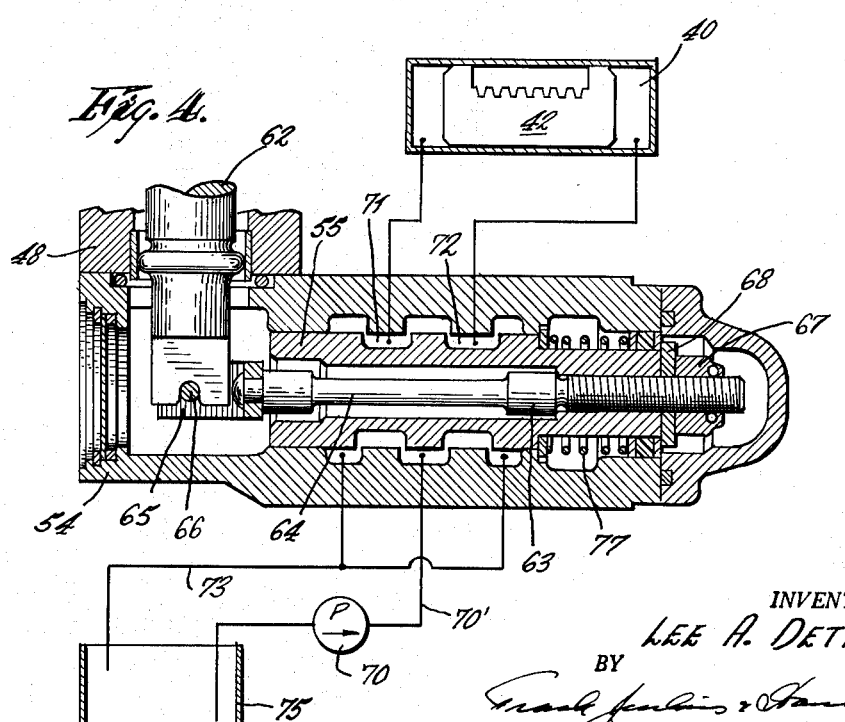
INVENTOR.
LEE A. DETTLOF,
BY
ATTORNEYS.

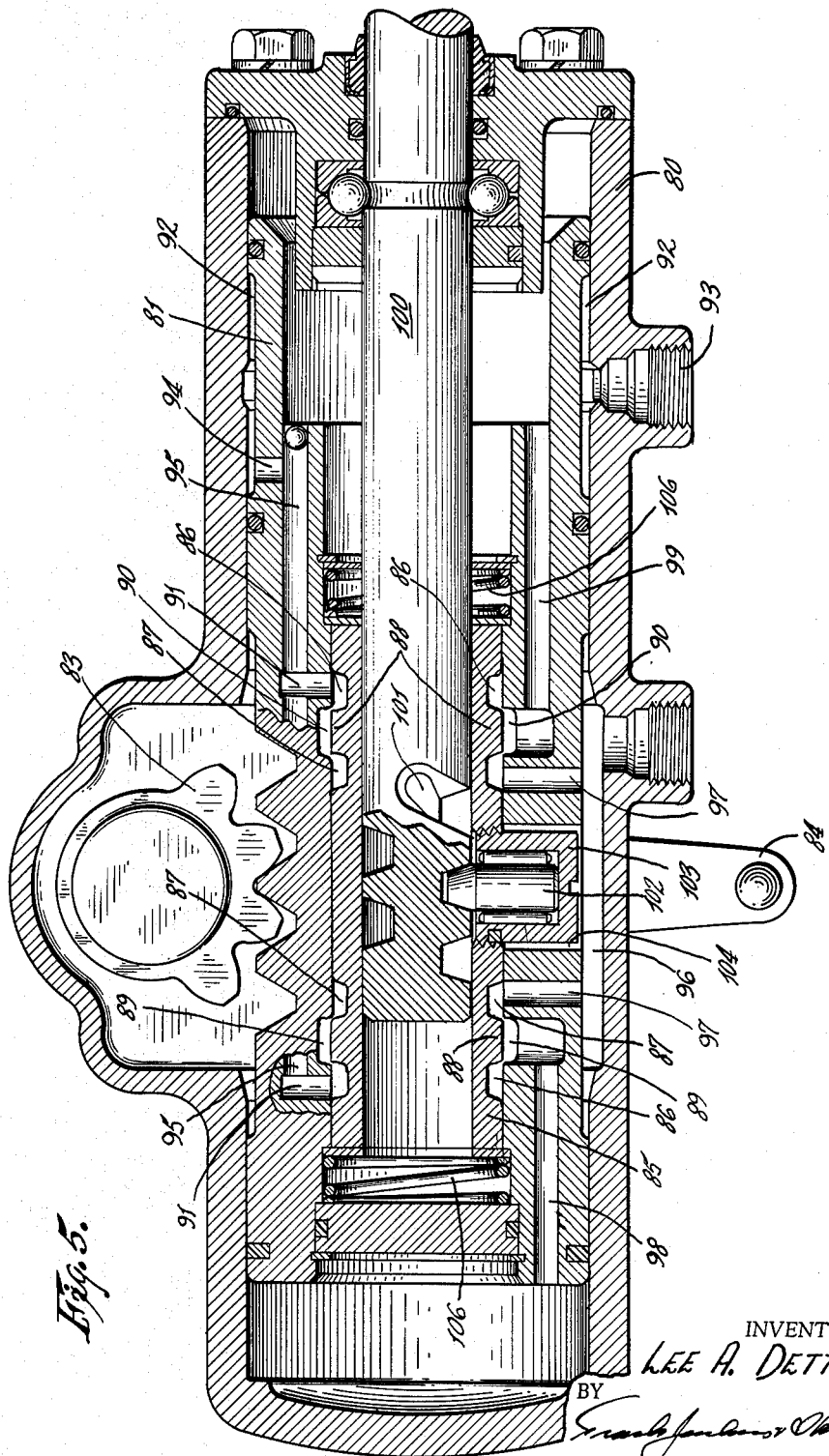

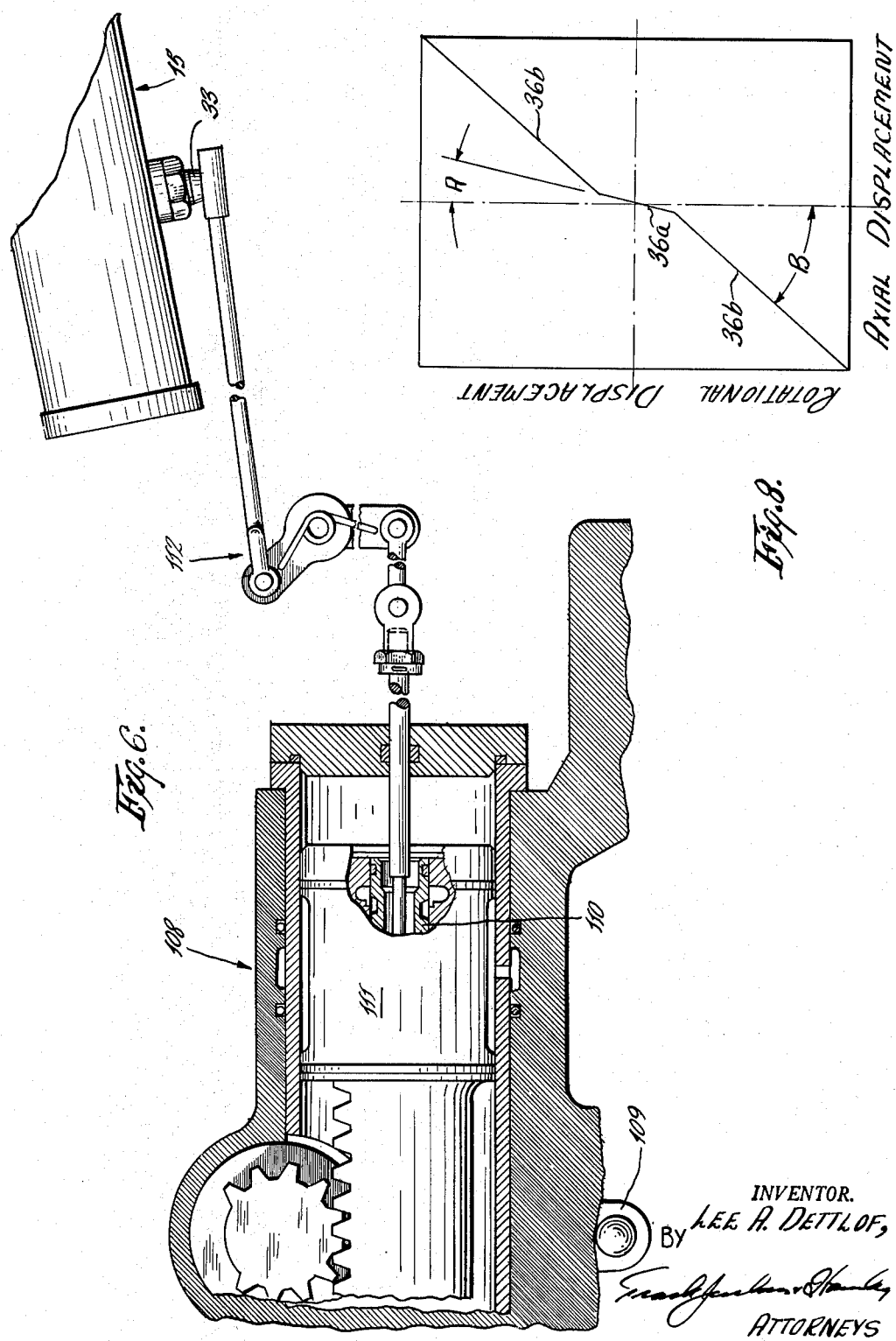

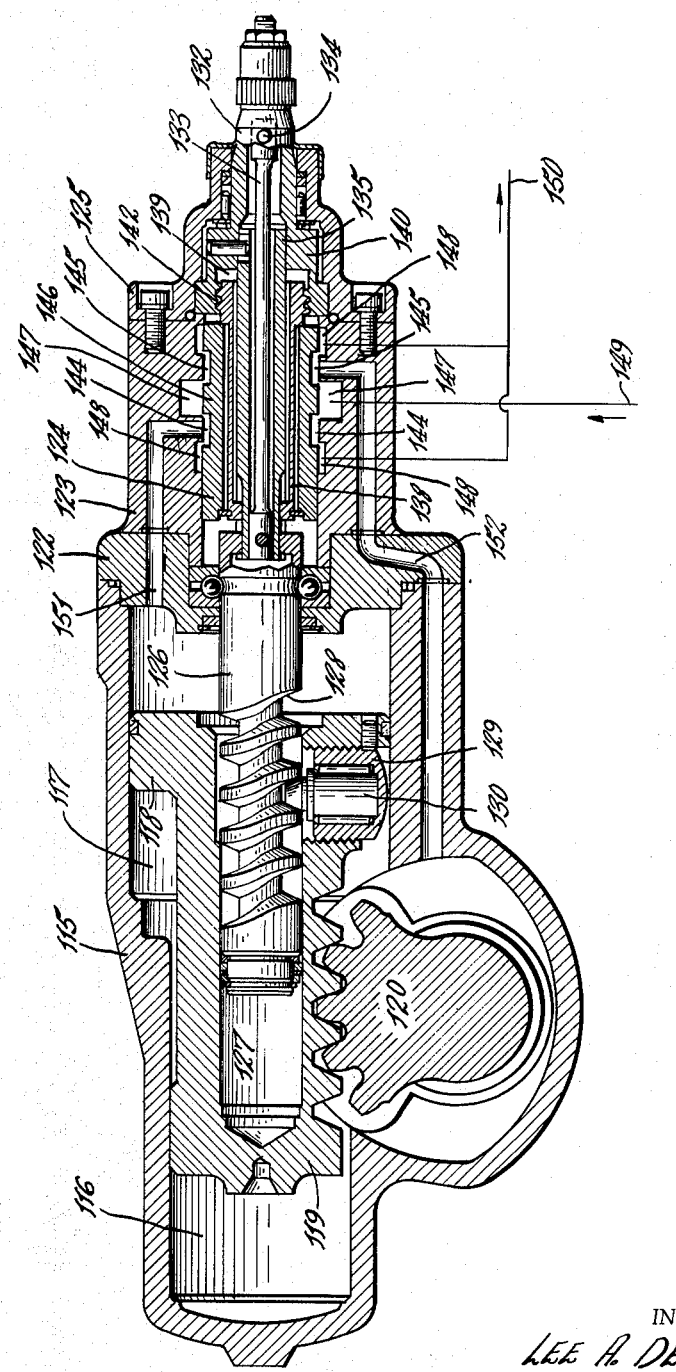

United States Patent Office 3,218,937
Patented Nov. 23, 1965

3,218,937
VARIABLE RATIO POWER STEERING GEAR
Lee A. Dettlof, Lafayette, Ind., assignor, by mesne assignments, to TRW Inc., a corporation of Ohio
Filed May 6, 1963, Ser. No. 278,308
18 Claims. (Cl. 91—368)

This invention relates to vehicle steering gears and more particularly to variable-ratio gears embodying a helically grooved cam. As such gears are commonly constructed, the cam follower riding in the helical cam groove is carried on an arm mounted to swing about an axis offset from the cam-axis and lying in a plane perpendicular to the cam axis, and the cam-groove has portions of different pitch to provide the desired variable ratio. Such gears may be either of the manual or power type.

In certain situations where a variable-ratio steering gear may be desired, available space or other factors prevents the employment of the swinging arm customarily used as a support for the cam follower. It is the principal object of this invention to provide a variable-ratio steering gear which does not require such swinging arm.

Steering gears in accordance with the present invention may be either manual or power-operated. Both types have in common a manually rotatable cam provided with a helical groove having portions of different pitch and a cam-operated member rectilinearly slidable axially of the cam, such member carrying a single stud or roller received in the cam groove. In most instances, the cam-groove will have a central portion of relatively small pitch angle and end portions of greater pitch angle, to provide a relatively high ratio when the dirigible vehicle wheels are in and adjacent their straight-ahead position and a relatively low ratio when such wheels are nearer the limits of their steering movement. In the case of a manual gear, the slidable element is operatively connected in any convenient manner to the steering knuckles or other dirigible-wheel mounting. A power steering gear embodying the invention includes a power-operated motor (conveniently hydraulic), a manually rotatable, cam-rotating control shaft, a yielding means resiliently yieldable to permit rotation of the control shaft unaccompanied by movement of the driven element of the motor, and a motor-controlling device controlled in response to yielding of the yieldable means.

In a power steering gear of the hydraulic type it is frequently convenient to dispose the helical cam within the hydraulic motor. In one such arrangement, the slidable member is the motor piston, the cam is arranged for limited axial movement under reaction from the piston, and such axial cam movement actuates the motor-controlling valve. In an alternative arrangement, an axially slidable valve member mounted within the piston constitutes the cam-operated member and surrounds the axially fixed cam. Either of the last mentioned arrangements may incorporate a preloaded valve-centering means operative to permit the gear to operate as a manual gear until steering effort reaches or exceeds a predetermined value.

In both the power-gear arrangements just described, the ratio between angular displacement of the cam and displacement of the movable valve member depends upon the pitch of the cam at the point occupied by the cam follower. As there may be situations where dependence of displacement of a sliding valve member upon the pitch of the cam would be undesirable, this invention contemplates a third type of hydraulic gear wherein the input shaft and the cam are relatively rotatable and interconnected by a resilient yieldable element, and movement of the sliding valve member is effected by the interaction of two screw-threadedly interconnected members rotatable respectively with the input shaft and the cam. In such an arrangement, the extent of valve displacement produced by any given angular displacement of input shaft while the piston is stationary will depend upon the pitch of the screw-threaded connection between the two members referred to, and hence can be independent of the pitch of the cam.

Further objects and features of the invention will be apparent from the following more detailed description and from the accompanying drawings, in which:

FIG. 1 is an isometric view of a vehicle steering system embodying a simple form of manual steering gear;

FIG. 2 is an elevation of the steering gear shown in FIG. 1 with parts thereof broken away and shown in section;

FIG. 3 is an axial section through a hydraulic motor of a power-steering gear wherein the cam is mounted within the motor-piston and is axially movable to actuate the valve controlling motor operation;

FIG. 4 is an axial section through a valve suitable for use with the steering gear of FIG. 3, showing the hydraulic connections;

FIG. 5 is an axial section through a power-steering gear of the hydraulic type wherein the cam is axially fixed and the cam-operated, rectilinearly movable member is a valve spool mounted within the piston and cooperating with piston passages to control the flow of pressure liquid;

FIG. 6 is an elevational view, partly in section, showing the steering gear of FIGS. 1 and 2 operatively associated with a hydraulic booster or servo mechanism;

FIG. 7 is an axial section through a hydraulic steering gear of the third type referred to above; and FIG. 8 represents a diagrammatic development of a cam such as may be used in any of the steering gears of FIGS. 1–7.

The steering system of FIG. 1, which is somewhat diagrammatic in character, is adapted for incorporation in small vehicles such as riding lawn mowers. It comprises an axle 9 carrying a pair of steering knuckles 10 connected through links 11 and 12 to one arm of a bell-crank 13 the other arm of which is connected through a link 14 to a rectilinearly movable element forming part of a steering gear designated in its entirety by the reference numeral 15. As will be clear from FIG. 2, the steering gear 15 comprises a tubular steering post 17 enclosing a steering shaft 18 to the lower end of which a generally helical cam 19 is rigidly attached. The shaft 18 projects upwardly beyond the upper end of the steering post 17 for attachment of a steering wheel 20.

As shown, the ends of the cam 19 are formed to provide the inner races of ball bearings, the outer races 22 of which fit and are supported within the tubular steering post 17. Conveniently, the outer races 22 are located axially of the shaft 18 by split spring rings 23 each of which is interposed between an outer race 22 and an annular flange 24 on the shaft 18. The assembly of the steering shaft 17, cam 19, and ball bearings may be located axially of the steering post 17 by tongues 25 struck inwardly from the wall of the steering post to bear against the upper face of the upper ball race 22 and by a ring or collar 26 which bears against the lower face of the lower race 22 and is held in place in the steering post 17 by screws 27.

The rectilinearly movable cam-operated member is in the form of a sleeve 30 slidably supported on the cylindrical surface of the cam 19. Rigidly mounted in the sleeve 30 intermediate the length thereof is a radially disposed internally threaded bushing 31 slidably received in an elongated slot 32 in the wall of the steering post 17; and mounted in the bushing 31 is a screw-threaded stud 33 formed at its outer end with a ball 34 forming part of a ball and socket joint 35 (FIG. 1) through which the stud is connected to the link 14. The inner end of the stud 33 has a frustoconical shape conforming to the opposed, inwardly converging walls of a helical groove 36 in the cam 19. The screw-thread mounting of the stud 33 in the bushing 31 permits adjustment of the stud radially of the cam to compensate for wear and maintain a proper fit of the inner stud-end in the cam groove 36. A lock nut 37 on the stud maintains it in adjusted position.

As previously mentioned, this invention contemplates the employment of a cam groove which has portions of different pitch angle. As indicated in FIG. 8, the preferred form of cam groove has a central portion 36a of a relatively small pitch-angle A and end portions 36b of greater pitch angle B to provide a relatively high ratio when the stud 33 is in the central portion of the cam groove and a relatively low ratio when it is in the end portions of such groove. The terms "high ratio" and "low ratio" as used herein have the meaning commonly attached to them in the art. That is, a high-ratio steering gear is one which requires relatively large movement of the steering wheel to effect a given displacement of the steered wheel, while a low-ratio steering gear is one in which a given displacement of the steered wheel can be effected by relatively small movement of the steering wheel.

In the operation of the steering gear shown in FIGS. 1 and 2, rotation of the steering shaft and cam causes the sleeve 30 to move longitudinally of the steering post, such sleeve-movement being transmitted to the steering kunckles 10 through the links 11, 12 and 14 and the bellcrank 13. The bushing 31 has a sliding fit within the slot 32 of the steering post, thus preventing rotation of the sleeve 30.

The steering gear shown in FIG. 3 embodies a hydraulic motor of the cylinder and piston type. The cylinder is shown as in the form of a sleeve 40 fixed in a housing 41. A piston 42 slidable in the cylinder 40 is formed intermediate its length with a series of rack teeth 43 cooperating with a gear sector 44 rigid with the conventional pitman arm 45. The cylinder 40 is effectively closed at one end (the left-hand end as shown) by a wall of the housing 41, while its other end is closed by a head 47 held in place by a cap 48. An input or control shaft 49, adapted at its outer end for operative connection to a steering wheel, extends through the cap 48 and head 47 and into a central bore 50 in the piston 42. The inner end of the shaft 49 is provided with a cam groove 51 having the general form of the groove 36 of FIGS. 2 and 8. Near the open end of the bore 50, a radial stud 52 is screw-threadedly mounted in the piston 42, such stud having a frustoconical end received in the cam groove 51.

The piston 42 is prevented from rotating about its axis by engagement of the rack teeth 43 with the gear sector 44, with the result that when the input shaft 49 is rotated cooperation of the cam groove 51 and stud 52 produces relative axial movement of the shaft 49 and piston. The shaft 49 is mounted for axial sliding movement, as well as rotating movement, in the head 47 and cap 48; and as movement of the piston 42 is opposed by the steering effort, the initial effect of rotation of the shaft 49 is to cause such shaft to move axially of itself. Such movement is used to actuate a control valve 53 controlling the supply of pressure fluid to one end or the other of the cylinder 42.

As shown in FIG. 4 the control valve comprises a housing 54 mounted on the cap 48 and enclosing a slidable valve spool 55, which is adapted to be moved longitudinally of itself in the housing 54 by axial movement of the shaft 49. For this purpose, a plate 60, within which the shaft 49 is freely rotatable, is locked in fixed axial position on such shaft within the cap 48. To prevent the plate 60 from rotating it is provided at its upper side with an opening slidably receiving a pin 61 which is fixed in the cylinder head 47 and projects outwardly therefrom parallel to the shaft 49. At its lower edge, the plate 60 is received in a slot in the upper end of a rocking lever 62 which extends into the valve housing 54 for operative connection to the valve spool 55.

For the purpose of receiving a connection between the valve spool and the lever 62, the valve spool has extending through it an opening counterbored from its inner end to receive an enlargement 63 provided on a valve stem 64 intermediate the length thereof. The stem 64 projects beyond the inner end of the valve spool 55 and there has attached to it a yoke 65 provided with a cross pin 66 received in a transverse slot in the lower end of the lever 62. The opposite end of the stem 64 is screw-threadedly received in the outer end of the spool 55, and projects outwardly therebeyond for reception of a nut 67 between which and the valve spool a collar 68 is clamped.

The valve spool 55 and the bore of the housing 54 are provided with annular lands and grooves of known type to control flow of pressure liquid from a pump 70. As shown, the control valve is of the open-center type. When the spool 55 is in its neutral position, pressure liquid supplied from pump 70 via conduit 70' to the middle annular groove in the valve housing divides within the housing and flows oppositely across axially spaced grooves 71 and 72 in the spool 55 to return through a return conduit 73 to a sump 75 from which the pump 70 draws the liquid. The grooves 71 and 72 communicate respectively with opposite ends of the cylinder 40. When the valve is in its neutral position, pressures in the grooves 71 and 72, which are respectively equal to those in opposite ends of the cylinder 40, as such as to produce no net piston-moving effort. When the control shaft 49 is rotated, the steering effort reacts upon it to urge it in one or the other of the axial directions. Axial movement of the control shaft is transmitted through the plate 60 and rocking lever 62 to the valve spool 55, displacing the spool in a direction opposite to that in which the control shaft is moved. For example, if the control shaft is rotated in a direction to urge the piston 42 to the left the control shaft will be urged to the right and movement of the shaft under that urging will move the valve spool 55 to the left to decrease pressure in the groove 71 and in the left-hand end of the cylinder 40 and to increase pressure in the groove 72 and in the right-hand end of the cylinder 40, with the result that the piston 42 will be hydraulically urged to the left.

In many instances it is desirable to provide a pre-loaded means which will hold the valve spool 55 in its neutral position, and the shaft 49 in fixed axial position, until the steering effort attains or exceeds a predetermined value. Such a pre-loaded valve-centering means, of a known type and embodying the collar 68 and a compression spring 77, is shown in FIG. 4. With such a pre-loaded centering means acting on the valve spool and shaft, the steering gear will operate essentially as a manual gear until the steering effort becomes great enough to compress the spring 77 and permit spool 55 to be displaced and direct pressure fluid into the proper end of the cylinder 40. Such operation will continue so long as the control shaft is being rotated to create the reaction which results in displacement of the valve spool; but when rotation of the control shaft ceases, the piston, now carrying the non-rotating control shaft with it, continues to move to the left under the influence of the difference between the fluid pressures acting on its opposite end faces until the valve spool 55 is restored to neutral position and said pressure difference disappears.

It will be noted that in FIG. 3 the right-hand end of the cylinder 40, through which the control shaft 49 projects, is of somewhat larger diameter than the opposite end of the cylinder. This arrangement compensates for the reduction in the effective area of the right-hand end of the piston due to the presence of the shaft 49 in the cylinder and piston, with the result that equal unit pressures in opposite ends of the cylinder will offset each other and eliminate any resultant piston-displacing effort.

The steering gear shown in FIG. 5 comprises a cylinder 80 within which an elongated hollow piston 81 is slidable. Intermediate its length, the piston is provided with a series of rack teeth meshing with a gear sector 83 which is rigid with the conventional pitman arm 84. A hollow valve spool 85 axially slidable within the piston is provided near each end with outer and inner axially spaced annular grooves 86 and 87 separated by an annular land 88. In the respective planes of the lands 88, the bore of the piston is provided with annular grooves 89 and 90 each slightly wider than the associated land 88.

Near one end, the right-hand end as shown, the piston 81 is provided exteriorly with an annular groove 92 wide enough to communicate in all piston-positions with an inlet port 93 for pressure liquid. The groove 92 also communicates through an opening 94 with a passage 95 extending longitudinally of the piston and communicating through openings 91 with both outer grooves 86 in the valve spool. Near the middle of the piston, the bore of the cylinder 80 is enlarged to provide a space 96 communicating with a return port 97 for pressure fluid. To increase the radial dimension of the space 96 and also, if desired, to increase its effective axial extent, the mid-portion of the piston may be reduced in diameter as shown in FIG. 5. In the respective planes of the inner spool-grooves 87, the piston is provided with radial passages 97 providing communication, in all positions of the spool, between the space 96 and those spool-grooves. The dimension of the space 96 parallel to the cylinder axis is great enough to insure communication, at all times, between the passages 97 and the space 96. Each of the annular piston grooves 89 and 90 communicates with a longitudinal passage 98 or 99 opening in the adjacent end face of the piston.

Pressure fluid entering the groove 92 through the pressure port 93 flows through the passages 94, 95 and 91 into the outer spool-grooves 86, whence it passes inwardly across the piston grooves 89 and 90 over the lands 88 into the inner spool-grooves 87 and through the passages 97 and space 96 to the return port. Pressures in the piston grooves 89 and 90 will be communicated to opposite ends of the cylinder through the passages 98 and 99, and the resultant of the respective forces created by those pressures will be applied to the piston. In the neutral position of the valve spool, the pressures in opposite ends of the cylinder will be such as not to create any resultant force acting on the piston, but if the valve spool is moved axially in the piston, one of those pressures will increase and the other will decrease to create a resultant force tending to move the piston in one direction or the other. For example, if the valve spool is moved to the left in the piston, the pressure in the piston groove 89 and in the left-hand end of the cylinder will be decreased, while that in the groove 90 and in the right-hand end of the cylinder will be increased, with the result that the piston will be urged to the left.

The means employed to control the axial position of the valve spool in the piston comprises a centrally disposed control shaft 100 which extends through one end of the cylinder and into the interior of the valve spool, where it is provided with a helical cam groove 101. Such cam groove, like those of the devices previously described and shown diagrammatically in FIG. 8, has portions of different pitch-angles. The cam follower in the device of FIG. 5 is a roller rotatably supported, preferably through needle bearings, in a cup 103 secured in the valve spool and projecting radially outward therefrom into an axially elongated slot 104 in the piston. The inner end of the roller 102 extends into the cam groove 101 and has a frustoconical form conforming to the cross-sectional shape of that groove. The fit of the cup 103 in the slot 104 prevents any angular displacement of the valve spool in the piston, while the elongation of the slot 104 permits such relative axial movement of the spool and piston as is necessary to effect the desired control of pressure fluid.

As in the case of the device of FIGS. 3 and 4, the steering gear of FIG. 5 includes a pre-loaded means of known type, including compression springs 106 located at opposite ends of the valve spool and acting to hold the valve spool in its neutral position until the spool-displacing effort becomes great enough to compress one or the other of the springs. As previously explained, such a valve-centering means permits the steering gear to operate as a manual gear until the steering effort reaches or exceeds a predetermined value. When the steering effort exceeds that value, one or the other of the springs 106 will yield to permit displacement of the valve spool 85 and cause creation of a pressure differential on the piston. The piston will move under the influence of that differential only so long as effort is applied to the control shaft to maintain the valve spool displaced; and when the applied effort is relieved, a continuing slight movement of the piston will restore it to neutral position relative to the valve 85 and thus eliminate the pressure differential which had caused the piston to move.

In FIG. 6, I have illustrated the steering gear 15 of FIGS. 1 and 2 as used to control a hydraulic motor 108 which operates a conventional pitman arm 109. In the motor of FIG. 6, the control valve mechanism 110 is embodied within the piston 111 and is actuated in response to movement of the steering-gear stud 33 through any appropriate type of operative connection 112.

In the power steering gears so far described the ratio between linear displacement of the movable valve member and angular displacement of the cam when the motor piston is stationary is a function of the pitch of the cam groove at the point occupied by the cam follower. In FIG. 7, there is illustrated a hydraulic steering gear in which the aforesaid ratio between valve displacement and cam displacement is independent of the pitch of the cam.

The steering gear of FIG. 7 comprises a cylinder 115 the bore of which includes a small-diameter portion 116 at the closed end of the cylinder and a large-diameter portion 117 at the open end. A piston disposed in the cylinder has a head 118 slidably received in the bore-portion 117 and an extension 119 slidably received in the bore portion 116. The extension 119 is provided with a series of rack teeth meshing with a gear sector 120 arranged for operative connection to the steered element or elements of a vehicle.

The open end of the cylinder 115 is closed by a removable head 122 to which is attached a valve body 123 having a bore that slidably receives a valve spool 124, such bore being coaxial with the cylinder. The outer end of the bore in valve body 123 is closed by a removable cap or cover 125.

Rotatably supported in fixed axial position in the head 122 is a cam 126 extending into a deep axial recesss 127 in the piston 118–119. The cam 126 is provided with a generally helical groove 128 which, like the cam grooves previously described, preferably has the general form indicated in FIG. 8. A cup 129 screw-threadingly mounted in the wall of the piston rotatably supports a radially disposed cam follower 130 the frustoconical inner end of which is received in the cam groove 128.

In contrast to the structures shown in FIGS. 3 and 5 the cam 126 is not integral or otherwise rigid with the input shaft. Instead, the input shaft 132, which is rotatably supported in fixed axial position from the cap 125, is operatively connected to the cam 126 through a resiliently yieldable torsion rod 133. As shown, the outer end of the torsion rod 133 extends into a recess in the inner end of the shaft 132 and is secured thereto by a transverse pin 134, while the opposite or inner end of the torsion rod is secured in similar fashion to the inner end of a sleeve 135 having, at that inner end, a set of external splines meshing with a set of internal splines provided in the adjacent end of the cam 126. As will be obvious, yielding of the torsion rod 133 under torque transmitted through it from the input shaft 132 to the cam 126 will permit relative rotation of the input shaft and the cam, and such relative rotation is utilized to effect linear movement of the valve spool 124 in the valve body 123.

To accomplish the purpose just mentioned, a second sleeve 138 surrounding the first mentioned sleeve 135 has at its inner end a set of internal splines meshing with the external splines of the sleeve 135. As a result of the various splined connections, the two sleeves 135 and 138 and the inner end of the torsion rod are all forced to rotate as a unit with the cam 126. The second sleeve extends outwardly from its splined connection to the sleeve 135 through the valve spool 124 and into an axial recess 139 provided in an enlarged head 140 on the inner end of the control shaft. Screw threads designated at 142 provide a connection between the outer end of the sleeve 138 and the head 140 of the control shaft. The valve spool 124 is axially fixed on the sleeve 138, with the result that when the control shaft 132 rotates relatively to the cam 126, the screw threads 142 will cause the sleeve 138 and spool 124 to move linearly to effect the valving action.

In the particular valving arrangement illustrated in FIG. 7 the spool 124 is provided externally with two annular grooves 144 and 145 separated by an intervening land 126. The valve body 123 is provided internally with a central annular groove 147 located in the plane of the land 146 and with two outer annular grooves 148 spaced outwardly from the central groove. A supply conduit 149 for liquid under pressure communicates with the groove 147, while a return or exhaust conduit 150 communicates with the grooves 148. The groove 144 in the spool communicates with the outer end of the cylinder bore-portion 117 through a passage 151 formed in the valve body 123 and head 122, while the spool-groove 145 communicates with the opposite end of the bore-portion 117 through a passage 152 having portions located in the valve body, in the head 122, and in the wall of the cylinder 115.

As shown, the various annular valve grooves and the land 146 have such widths and axial dispositions that the valve functions as an open-center valve, pressure fluid entering the groove 147 through the conduit 149 dividing and flowing outwardly across the spool grooves 144 and 145 to exhaust by way of the grooves 148 and conduit 150. The respective pressures in the spool grooves 144 and 145 are communicated to opposite ends of the bore-portion 117 of the cylinder and, when the valve spool is in its neutral position, have relative values such as to produce no piston-moving effort.

In operation of the device shown in FIG. 7, when no torque is being applied to the input shaft, the torsion rod 133 will be unstressed and the valve spool will occupy its neutral position. When a torque is applied to the input shaft and transmitted through the torsion rod to the cam 126, the steering effort reacting on the cam 126 will tend to hold stationary not only the cam but also the two sleeves 135 and 138, which are connected to the cam by the splined connections previously described. If the torque applied to the input shaft is great enough to cause the rod 133 to yield in torsion, the control shaft will rotate relatively to the sleeve 138, and the screw-threaded connection 142 between that sleeve and the inner end of the control shaft will cause the sleeve to move axially and carry with it the valve spool 124. If the movement of the valve spool so effected is to the left, the pressure in the spool groove 148 and in the left-hand end of the cylinder will increase, while that in the spool groove 144 and in the right-hand end of the cylinder will decrease, to produce a net effort urging the piston 118 to the right. Conversely, displacement of the valve spool rightwardly from its neutral position will increase pressure in the right-hand end of the cylinder 115 and decrease pressure in the left-hand end to urge the piston to the left. In either direction of operation, the existence of an effective piston-displacing pressure differential in opposite ends of the cylinder 115 requires the valve-spool 124 to be displaced from its neutral position, and such displacement of the valve-spool in turn requires the existence of torsional strain or distortion in the rod 133. Existence of torsional strain in the rod 133 requires that oppositely directed torques be applied respectively to opposite ends of such rod, the torque applied to the inner, or left-hand, end of the rod resulting from the load transferred between the piston and the cam 126 and the other torque being that applied to the control shaft 132. Therefore, maintenance of pressure-produced piston movement requires that the control shaft be rotated rapidly enough by an applied torque great enough to maintain the rod 133 strained and the valve spool accordingly displaced from its neutral position. When the control shaft is brought to rest and the outer end of the rod 133 and the member 140 thereby held stationary, continuing pressure-produced movement of the piston relieves the load applied to the cam, thereby permitting the torsional stress in the rod to rotate the member 138 until the valve spool is brought to its neutral position and hydraulic forces acting on opposite ends of the piston become balanced to bring the piston to rest.

It is usually desirable to limit the extent of relative rotation of the input shaft and the cam, and thus limit the maximum stress which can be impressed upon the torsion rod. For this purpose, I have shown the head on the inner end of the input shaft 123 as provided with a radially extending pin 154 which projects into a slot formed in the outer end of the inner sleeve 135, such slot having a circumferential extent preventing relative rotation of the input shaft and cam beyond the extent desired.

I claim as my invention:

1. In a power steering gear, a source of fluid under pressure, a hydraulic motor having a cylinder, a piston rectilinearly reciprocable therein, and a movable output member operated by said piston and adapted for operative connection to a steered element of a vehicle, a rotatable cam having a portion received in an axially extending bore in said piston, said cam being provided within the piston with a helical groove having portions of different pitch-angle, a cam follower mounted in said piston and having an end portion extending into said groove to produce relative axial movement of the cam and piston when the cam is rotated in the piston, said end portion having an outer surface which is a surface of revolution whose axis is perpendicular to the path of piston reciprocation, said cam having a limited range of axial movement relative to the housing and being movable within such range as a result of the axial component of reaction impressed upon it by said cam follower, and valve means controlling the flow of fluid under pressure from said source to said motor, said valve means being responsive to axial movements of the cam.

2. A steering gear as set forth in claim 1 with the addition that said cam-groove portions of different pitch angle include a central portion of relatively low pitch angle and end portions of greater pitch angle.

3. A steering gear as set forth in claim 1 with the addition of a preloaded yielding means opposing axial movement of said cam in either direction from a neutral position, said valve means functioning when the cam is in such neutral position to prevent supply of fluid under pressure to the motor.

4. In a power steering gear, a source of fluid under pressure, a hydraulic motor having a cylinder, a piston rectilinearly reciprocable therein, and a movable output member operated by said piston and adapted for operative connection to a steered element of a vehicle, a rotatable cam having a portion received in an axially extending bore in said piston, said cam being provided within the piston with a helical groove having portions of different pitch-angle, a cam follower mounted in said piston and having an end portion extending into said groove to produce relative axial movement of the cam and piston when the cam is rotated in the piston, said end portion having an outer surface which is a surface of revolution whose axis is perpendicular to the path of piston reciprocation, means including a manually rotatable control shaft for rotating said cam in the piston, yielding means permitting a limited rotation of said control shaft unaccompanied by movement of the piston, and valve means responsive to yielding of said yielding means for controlling the flow of fluid under pressure from said source to the motor.

5. A steering gear as set forth in claim 4 with the addition that said cam-groove portions of different pitch angle include a central portion of relatively low pitch angle and end portions of greater pitch angle.

6. A steering gear as set forth in claim 4 with the addition that said yielding means is preloaded and opposes axial movement of said cam in either direction from a neutral position, said valve means functioning when the cam is in such neutral position to prevent supply of fluid under pressure to the motor.

7. A vehicle steering gear, comprising a rotatable cam having a helical groove including portions of different pitch-angle, a cam follower including an end portion received in said groove and having an outer surface which is a surface of revolution, a cam-follower support rectilinearly reciprocable axially of the cam, said cam-follower being mounted in said support with the axis of said surface of revolution perpendicular to the path of reciprocation of said support, and means for operatively connecting said support to a steered element of a vehicle.

8. A steering gear as set forth in claim 7 with the addition that said cam-groove portions of different pitch angle include a central portion of relatively low pitch angle and end portions of greater pitch angle.

9. A steering gear as set forth in claim 7 with the addition of a tubular housing enclosing said cam and support, said housing having a longitudinal slot, said cam follower having an outer end portion projecting outwardly from said support through said slot and constituting part of said last named means.

10. A steering gear as set forth in claim 7 characterized in that said support is a sleeve-like element in which the cam is rotatably received.

11. A steering gear as set forth in claim 10 with the addition that said sleeve-like element is the piston of a hydraulic servo motor having a cylinder in which the piston is slidable.

12. A steering gear as set forth in claim 10 with the addition that said sleeve-like element is the inner member of two concentric relatively slidable valve members, the outer of said two members being the piston of a hydraulic servo motor controlled by relative sliding movement of the two valve members.

13. In a power steering gear, a hydraulic motor comprising a cylinder and a piston rectilinearly reciprocable therein, said piston having an axial recess, an axially fixed cam rotatably received in said recess, said cam having a generally helical groove including portions of different pitch angle, a cam follower carried by said piston and having an end portion received in said groove whereby rotation of the cam relative to the piston will produce axial movement of the piston, said end portion having an outer surface which is a surface of revolution whose axis is perpendicular to the path of piston reciprocation, an input shaft, resilient means operatively interconnecting said input shaft and cam to permit but resiliently oppose relative rotation of the cam and shaft, first and second screw-threadedly interconnected members rotatable respectively with the cam and input shaft, said first member being axially fixed and said second member being axially movable, a source of fluid under pressure, and valve means operable in response to axial movement of said second member for controlling the flow of fluid under pressure to said cylinder.

14. A steering gear as set forth in claim 13 with the addition that said cam-groove portions of different pitch angle include a central portion of relatively low pitch angle and end portions of greater pitch angle.

15. A steering gear as set forth in claim 13 with the addition that said valve means comprises a fixed outer valve member and an inner member slidable therein, said inner member being mounted on the second of said screw-threadedly interconnected members for axial movement therewith.

16. A steering gear as set forth in claim 15 with the addition that said inner valve member is hollow and said cam and input shaft are coaxial, said resilient means being a torsion bar extending through said inner valve member and having its opposite ends connected respectively to the cam and input shaft.

17. In a power steering gear, a hydraulic motor comprising a cylinder and a piston rectilinearly reciprocable therein, said piston having an axial recess, an axially fixed cam rotatably received in said recess, said cam having a generally helical groove including portions of different pitch angle, a cam follower carried by said piston and having an end portion received in said groove whereby rotation of the cam relative to the piston will produce axial movement of the piston, said end portion having an outer surface which is a surface of revolution whose axis is perpendicular to the path of piston reciprocation, an input shaft, resilient means operatively interconnecting said input shaft and cam to permit but resiliently oppose relative rotation of the cam and shaft, a source of fluid under pressure, valve means comprising a pair of valve members one of which is rectilinearly slidable relative to the other to control flow of fluid under pressure from said source to said motor, and means responsive to relative rotation of the cam and control shaft for effecting relative sliding movement of said valve members.

18. A steering gear as set forth in claim 4 with the addition that said yielding means acts between said control shaft and cam and permits limited rotation of the control shaft while the cam remains stationary about its axis.

References Cited by the Examiner

UNITED STATES PATENTS

| | | | |
|---|---|---|---|
| 2,490,449 | 12/1949 | Lynch | 74—57 |
| 2,782,652 | 2/1957 | Fletcher | 91—382 |
| 2,865,217 | 12/1958 | Bishop | 91—380 |
| 2,929,364 | 3/1960 | Gribler | 91—382 |

SAMUEL LEVINE, *Primary Examiner.*

FRED E. ENGELTHALER, *Examiner.*